United States Patent
Erikstrup

(10) Patent No.: US 7,858,259 B2
(45) Date of Patent: Dec. 28, 2010

(54) FUEL CELL STACK CLAMPING STRUCTURE AND SOLID OXIDE FUEL CELL STACK

(75) Inventor: Niels Erikstrup, Frederiksberg (DK)

(73) Assignee: Topsoe Fuel Cell A/S, Lyngby (DK)

(*) Notice: Subject to any disclaimer, the term of this patent is extended or adjusted under 35 U.S.C. 154(b) by 83 days.

(21) Appl. No.: 12/021,069

(22) Filed: Jan. 28, 2008

(65) Prior Publication Data

US 2008/0182152 A1  Jul. 31, 2008

Related U.S. Application Data

(63) Continuation-in-part of application No. 11/698,073, filed on Jan. 26, 2007, now abandoned.

(51) Int. Cl.
*H01M 8/24* (2006.01)
(52) U.S. Cl. .................. 429/452; 429/465; 429/495
(58) Field of Classification Search .............. 429/19, 429/12, 30, 26, 34, 35, 37, 163, 167, 168, 429/175, 176, 452, 465, 495
See application file for complete search history.

(56) References Cited

U.S. PATENT DOCUMENTS

| | | | |
|---|---|---|---|
| 5,009,968 A * | 4/1991 | Guthrie et al. ............. 429/26 |
| 5,993,987 A | 11/1999 | Wozniczka et al. | |
| 6,124,051 A * | 9/2000 | Johnson .................... 429/26 |
| 2004/0151953 A1 * | 8/2004 | Kirk et al. .................. 429/12 |
| 2006/0093890 A1 | 5/2006 | Steinbroner | |

* cited by examiner

*Primary Examiner*—Jennifer K Michener
*Assistant Examiner*—Carlos Barcena
(74) *Attorney, Agent, or Firm*—Dickstein Shapiro LLP

(57) ABSTRACT

A clamping structure for a planar solid oxide fuel cell stack comprising a flexible sheet and a rigid, thermally insulating end block, the flexible sheet being capable of bending into a primarily convex shape, the rigid, thermally insulating end block shaped as a rectangular base with a planar surface and an opposing surface that is primarily convex in shape, the flexible sheet being placed adjacent to the opposing surface of the rigid, thermally insulating end block, the flexible sheet thereby bending to obtain a shape that is primarily convex. The invention also relates to a solid oxide fuel cell stack and a process for the compression of the stack.

14 Claims, 9 Drawing Sheets

US 7,858,259 B2

FUEL CELL STACK CLAMPING STRUCTURE AND SOLID OXIDE FUEL CELL STACK

This is a continuation-in-part of application Ser. No. 11/698,073, filed Jan. 26, 2007, now abandoned.

BACKGROUND OF THE INVENTION

1. Field of the Invention

The invention relates to a clamping structure for a solid oxide fuel cell stack. More particularly, the invention relates to a planar solid oxide fuel cell stack which is compressed using a clamping structure which includes a four-sided planar flexible sheet.

2. Description of the Related Art

A planar solid oxide fuel cell (SOFC) stack consists of a repeated sequence of solid oxide fuel cells across which an electrical voltage is created alternating with interconnects.

The stack typically includes 5 to 200 fuel cells and consists of a sequence of fuel cells comprising an anode, a cathode and a solid oxide electrolyte each fuel cell alternating with the interconnect. The fuel cells are provided with fuel and oxidant by a manifold system via an internal channel system. Fuel and oxidant are distributed from layer to layer in the fuel cell stack by a channel system. During operation, an electrochemical voltage is created across the individual fuel cells. The interconnect serves to introduce oxidant and fuel to the fuel cells in separate channels and to collect electrons from one fuel cell and transmit and deliver them to an adjacent fuel cell.

The walls of the internal channel system must be gas tight in order to avoid leakages of gas to the external surrounding or untimely mixing of oxidant and fuel. This is ensured by using a sealing material of for instance glass, and/or by providing an intimate and direct bonding between the fuel cell and interconnect on the available sealing surfaces.

The gas tight behaviour and the desired electrical contact between the fuel cells and interconnects are ensured in a SOFC stack by pressing the fuel cells and interconnects together with a well-defined compressive force using a clamping structure. In some cases the required compressive force can be as high as 100 N/cm$^2$ across each fuel cell surface during operation of the fuel cell stack. The magnitude of the compressive force is dependent on the actual design of the interconnect and fuel cell and on the gas pressure during operation. The compressive force is provided on the end surfaces of the stack.

A SOFC stack typically operates at temperatures of 600-850° C. Such high temperatures represent a challenge to the design of the mechanical clamping structure required to generate compressive forces of such a magnitude.

It is important that the compressive force is exerted on a surface area corresponding to the surface area of the fuel cells in the stack. The inner sections of the end surfaces of the stack must be compressed in order to maintain electrical contact and the peripheries of the end surfaces must be compressed in order to make the stack gas tight. Conventionally, fuel cells have surface areas of 80-1000 cm$^2$ and compressive forces of up to 100,000 N can be required.

Various types of clamping structures or assemblies are known for instance assemblies using bands for compressing planar fuel cell stacks. U.S. Pat. No. 5,993,987 discloses a fuel cell stack comprising at least one band circumscribing end plates and interposed electrochemical fuel cells. A resilient member cooperating with the band urges the end plates towards each other thereby applying compressive force to the fuel cells to promote sealing and electrical contact between the layers forming the fuel cell stack.

US patent application No. 2006093890 discloses a fuel cell stack maintained in compression by a strap assembly that includes a compressive band extending around the end plates of the fuel cell stack.

Traditional clamping structures are based on the compression of a metallic planar end plate flange placed at either end surface of the SOFC stack and extending beyond the surface area defined by the fuel cells in the stack. The two end plate flanges are connected to each other at their periphery external to the fuel cells by a clamping structure of tie-rods, pipe sections, springs and nuts for creating a compressive force in the stack.

The forces experienced in the tie-rods can be established with the aid of the elasticity of the tie-rods using disc springs, coil springs, gas springs or using pneumatic cylinders or hydraulic cylinders.

SOFC stacks typically operate at temperatures of 600-850° C. At this temperature most metallic materials when subjected to mechanical stress will creep with time. It is therefore advantageous to maintain the metallic sections that experience mechanical stress at as low a temperature as possible.

The tie-rods are typically inserted through the two planar end plate flanges, thereafter through pipe sections of a specified length extending beyond the SOFC stack and through springs placed at the ends of the pipe sections. The pipe sections function as spacers for distancing the springs from the fuel cell stack such that the springs are maintained at a less severe operating temperature than the high temperature experienced during operation of the stack. Nuts positioned after the springs are used to assemble these components and thereby to adjust the compressive force on the SOFC stack.

During operation of the SOFC stack the tie-rods are at a temperature approximately equivalent to the stacks operation temperature. The tension created thereby in the tie-rods results in a tendency of the tie-rods to creep.

During operation of the SOFC stack the planar end plate flanges are also subjected to mechanical tension during influence of the forces from both the tie-rods in the clamping system and the stack causing creep of the planar flanges. The planar flanges therefore tend to become convex in form.

In an alternative clamping structure the tie-rods and the planar end plate flanges are during operation at a much lower temperature than the SOFC stack's operation temperature. This is made possible by thermally insulating the SOFC stack at the sides of the stack using insulation material. Placing additional insulation material at either end of the stack adjacent to the planar end plates allows a transfer of the compressive force obtained during clamping through the additional insulation material. The tie-rods and the planar end plate flanges can thus experience greater tension before undesirable creep sets in. The disadvantage of these types of clamping structures using tie-rods are associated with the planar end plate flange placed at each end surface of the SOFC stack and extending beyond the surface area defined by the fuel cells in the stack. Each planar end plate flange experiences a bending force when exposed to the mechanical forces originating from the tie-rods and the stack.

These undesirable effects result in a reduction of the compressive force on the whole stack or in an uneven distribution of the compressive force on the stack leading to poorer electrical contact and/or the stack becomes less gas tight and leakage of gas to the external surroundings cannot be avoided.

The flanges used are therefore of a sizeable thickness, typically 5-20 mm, in order to absorb these forces and minimise the deformation of the flanges, while simultaneously preventing gas leakage and loss of electrical contact in the stack.

WO patent application No. 2006/012844 discloses a fuel cell stack for solid oxide fuel cells with a clamping device and a heat insulating device. The heat insulating device is located between the fuel cells and the clamping device, which has pressure distribution elements in the form of either flat plates that are parallel to each other, a hemi-spherical shell or are semi-cylindrical. The pressure distribution elements ensure that the pressure is distributed uniformly on the entire surface of the heat insulating elements.

No details are given regarding the construction of the pressure distribution elements, but it is known in the art to use flat plates that are of metal. Furthermore the application of hemi-spherical shells implies the use of a rigid or hard material shaped in the form of a hemi-sphere.

Generally pressure distribution elements in the form of flat plates are manufactured from metal. Pressure distribution shells or cylinders of metal can be prepared by metal forming processes such as deep drawing, which is a more complicated process than the process used in preparing flat plates.

The economy associated with solid oxide fuel cells is high and there is a constant need for a reduction in the cost of SOFC stacks without any losses in the chemical and/or physical properties of the various stack components.

Furthermore, there is also a need for solid oxide fuel cell components that show acceptable physical properties while contributing to a reduction in weight and/or volume of the stack.

It is an objective of the invention to provide a clamping structure for a planar SOFC stack in which deformation due to uneven distribution of compressive forces is avoided during operation of the SOFC stack.

It is a further objective of the invention to provide a planar SOFC stack having reduced weight and volume.

SUMMARY OF THE INVENTION

The invention concerns a clamping structure for a planar solid oxide fuel cell stack comprising a planar, flexible sheet and a rigid, thermally insulating end block, the planar, flexible sheet being capable of bending into a primarily convex shape, the rigid, thermally insulating end block shaped as a rectangular base with a planar surface and an opposing surface that is primarily convex in shape, the flexible sheet being placed on the opposing surface of the rigid, thermally insulating end block, the flexible sheet thereby bending to obtain a shape that is primarily convex upon exertion of a compressive force across each solid oxide fuel cell surface.

The invention also concerns a SOFC stack comprising the clamping structure wherein the stack comprises one or more planar solid oxide fuel cells interposed between end plates, at least one end plate lying adjacent to the clamping structure comprising a flexible sheet and a thermally insulating end block, the flexible sheet being capable of bending into a primarily convex shape, the thermally insulating end block shaped as a rectangular base with a planar surface and an opposing surface that is primarily convex in shape, the flexible sheet being placed adjacent to the opposing surface of the thermally insulating end block, the flexible sheet thereby bending to obtain a shape that is primarily convex and the at least one end plate being in contact with the planar surface of the rectangular base of the thermally insulating end block upon exertion of a compressive force across each solid oxide fuel cell surface.

The invention also concerns a process for the compression of the solid oxide fuel cell stack comprising interposing one or more planar solid oxide fuel cells between end plates, placing adjacent to at least one end plate a clamping structure comprising a flexible sheet and a thermally insulating end block, the flexible sheet being capable of bending into a primarily convex shape, the thermally insulating end block shaped as a rectangular base with a planar surface and an opposing surface that is primarily convex in shape, placing the flexible sheet adjacent to the opposing surface of the thermally insulating end block bending the flexible sheet to obtain a shape that is primarily convex and placing the at least one end plate in contact with the planar surface of the rectangular base of the thermally insulating end block and exerting a compressive force across each solid oxide fuel cell surface.

A shape that is primarily convex is defined as a shape that is curved and rounded outwards. The primarily convex shape can be curved in one direction only i.e. single curved, or it can be curved in all directions i.e. double curved. The curve and thus the shape can be smoothly or stepwise rounded outwards. Preferable are shapes curved in one direction only i.e. single curved shapes.

By flexible is meant the ability to bend easily or flex i.e. non-rigid.

When applying the clamping structure of the invention to a planar SOFC stack the use of planar end plate flanges can be avoided completely. This is advantageous since a lower weight of the SOFC stack is thus obtained.

The clamping structure of the invention is flexible in nature and can accommodate the forces present in the stack during operation without creating any distortion of the various elements in the stack.

Electrical contact between the various layers in the stack is thus maintained, the stack remains gas tight and leakage of gas to the external surroundings is avoided.

Additionally, the SOFC stack of the invention is smaller than the conventional SOFC stack since the thick planar end plates are avoided. Since the planar end plates are usually made of metal, in their absence the SOFC stack of the invention is lighter and requires less material or metal for its fabrication.

DETAILED DESCRIPTION OF THE INVENTION

Figure 1:
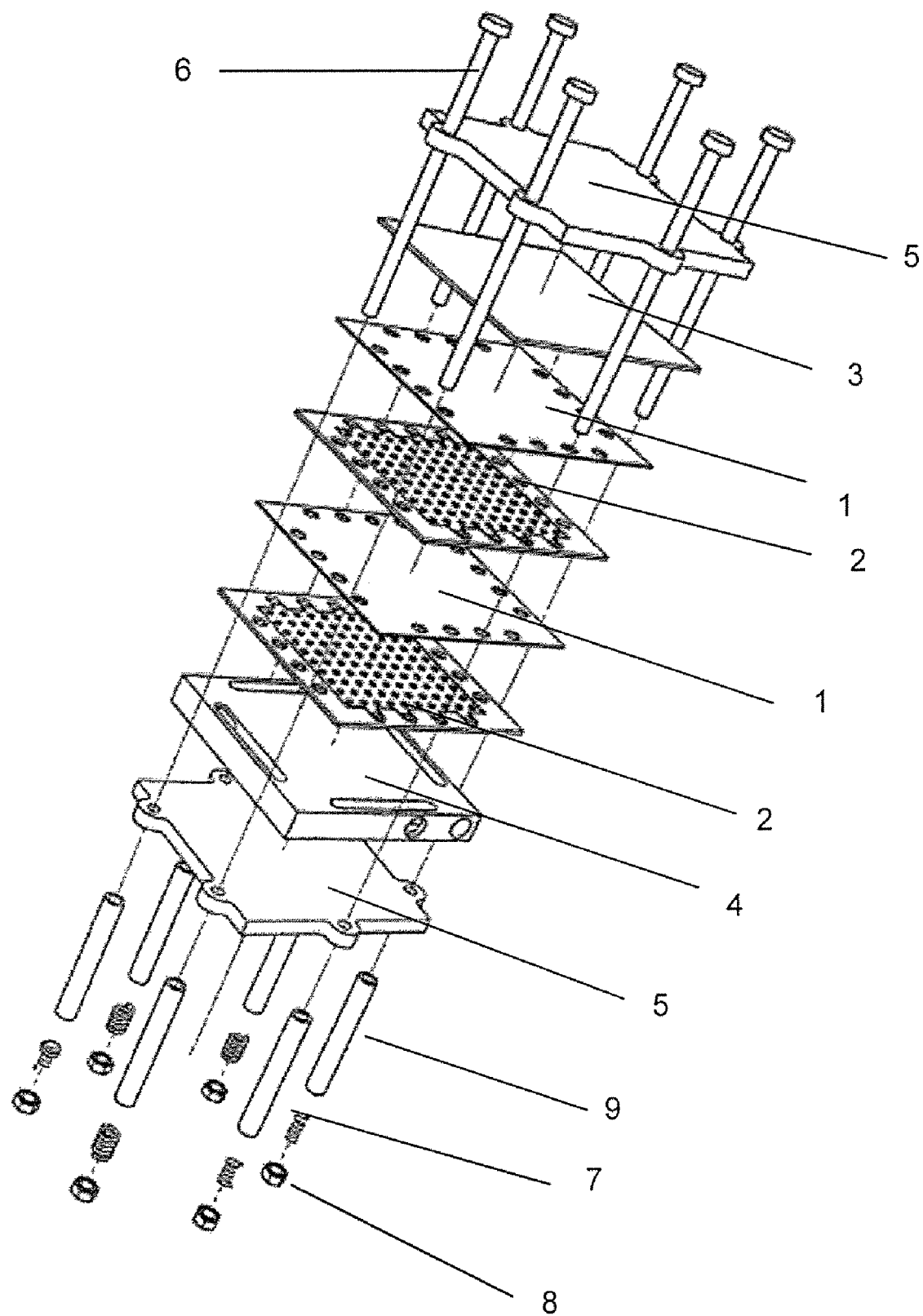
FIG. 1 shows a conventional dissembled SOFC stack.

The clamping structure of the invention is very simple in structure and comprises a flexible, planar sheet capable of bending and becoming primarily convex in shape. It comprises also an insulating end block providing thermal insulation and shaped in a convex manner on the outer surface. This primarily convex shape of the insulating end block forces the flexible sheet into a convex shape when in contact with the insulating end block and under compression. The shape of the planar, flexible sheet adapts to the shape of the insulating end block. The primarily convex surface of the insulating end block adjacent to the flexible sheet thus fits into the convex flexible sheet.

The insulating end block is positioned directly between the flexible sheet and one end surface of the SOFC stack. No planar end plate flange is needed between the SOFC stack and the end block. The surface of the insulating end block adjacent to the SOFC stack is planar and has a surface area identical to the surface area of the SOFC stack i.e. the two surfaces have the same overall dimensions. The SOFC stack can also be thermally insulated on its remaining surfaces.

The primarily convex surface of the insulating end block forces the flexible sheet to change shape from planar to convex upon compression. The resulting convex flexible sheet thus curves away from the SOFC stack. Thereby, the mechanical tension in the flexible sheet lies in the plane of the flexible sheet. The flexible sheet does not have to withstand bending forces. This allows the flexible sheet to be dimensioned with a much smaller thickness and it is thereby much lighter in weight than the conventional planar end plate flanges. The forces between the flexible sheet and the insulating end block are therefore distributed in a manner which ensures that the insulating end block is in compression.

The planar flexible sheet can preferably have a length and a breadth of 1-2 times the side length of the solid oxide fuel cells in the stack. When the flexible sheet is bent to obtain a shape that is curved in one direction only i.e. a single curved shape, then it is preferably made by stamping or laser cutting of a thin metal sheet and thereafter bent along the curvature of the thermal insulation. The sheet can be so thin that no tools are needed for the bending, which is not the case if the sheet is to be bent into a shape that is curved in all directions i.e. a double curved shape. This shape requires deep drawing.

The flexible sheet can be smoothly or stepwise rounded outward. The primarily convex shape it attains on bending can be curved in all directions (i.e. double curved) or curved in one direction only (i.e. single curved). The flexible sheet can be bent into a shape that is curved in all directions and forms a segment of a sphere e.g. a domed shape. Preferably the flexible sheet is bent to form a primarily convex shape that is curved in one direction only (i.e. single curved). For example, the flexible sheet can be bent into a shape that is curved in one direction only and forms a segment of a cylinder e.g. an arched shape.

Figure 7A:
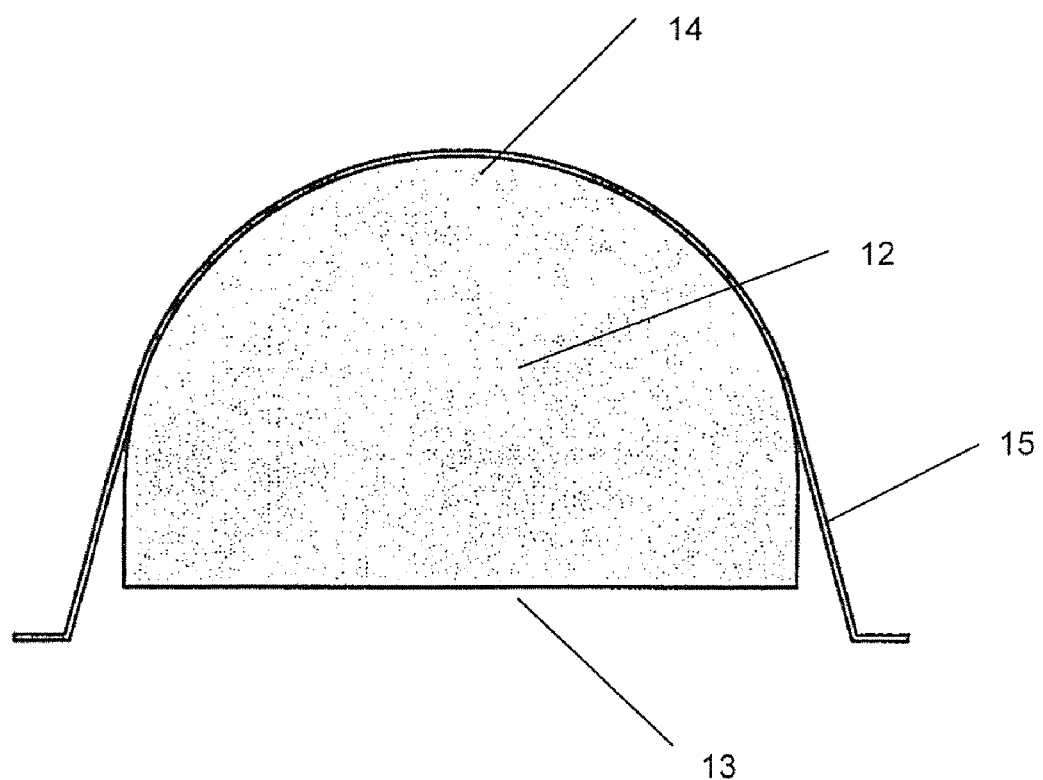
FIGS. 7a, 7b, 7c, 7d and 7e show transverse cross-sections of different geometrical embodiments of the insulating end block.
Figure 7B:
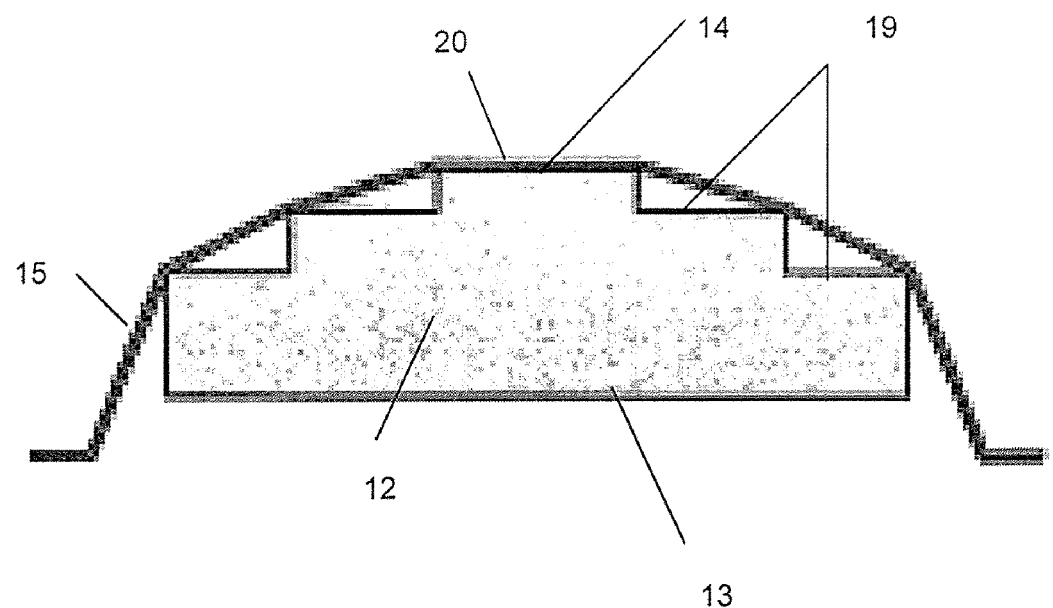
Figure 7C:
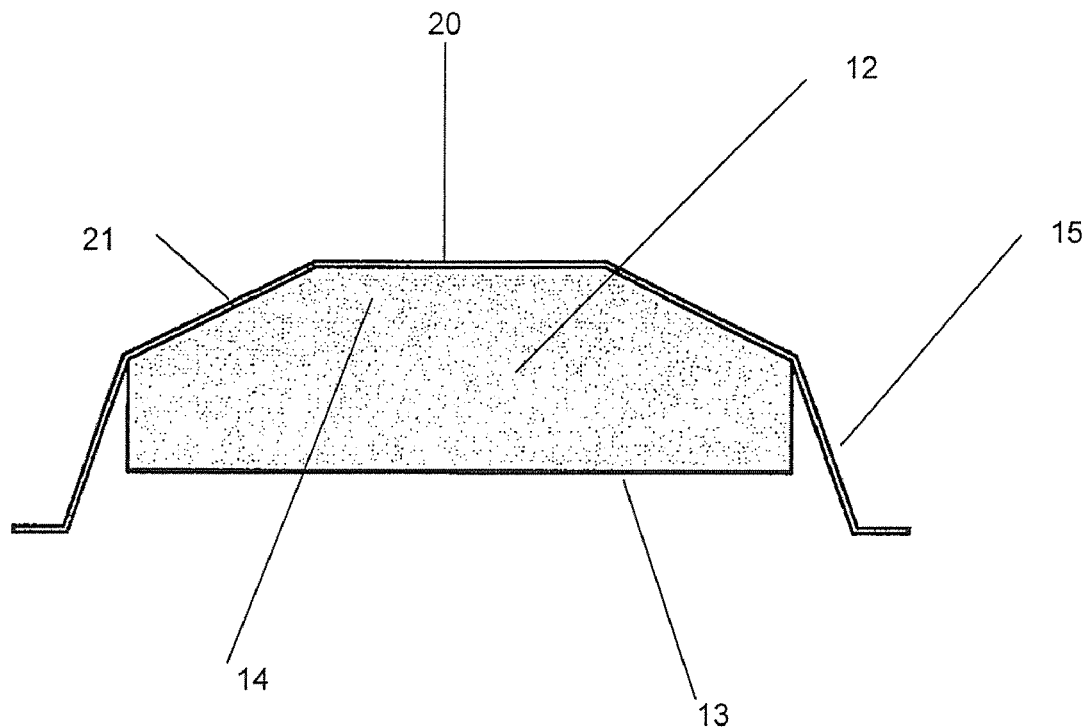
Figure 7D:
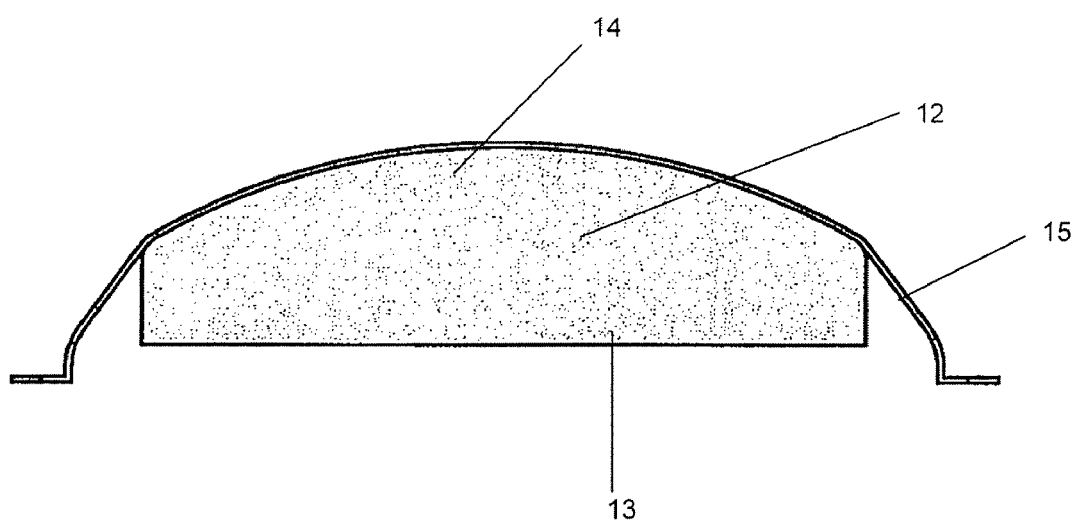
Figure 7E:
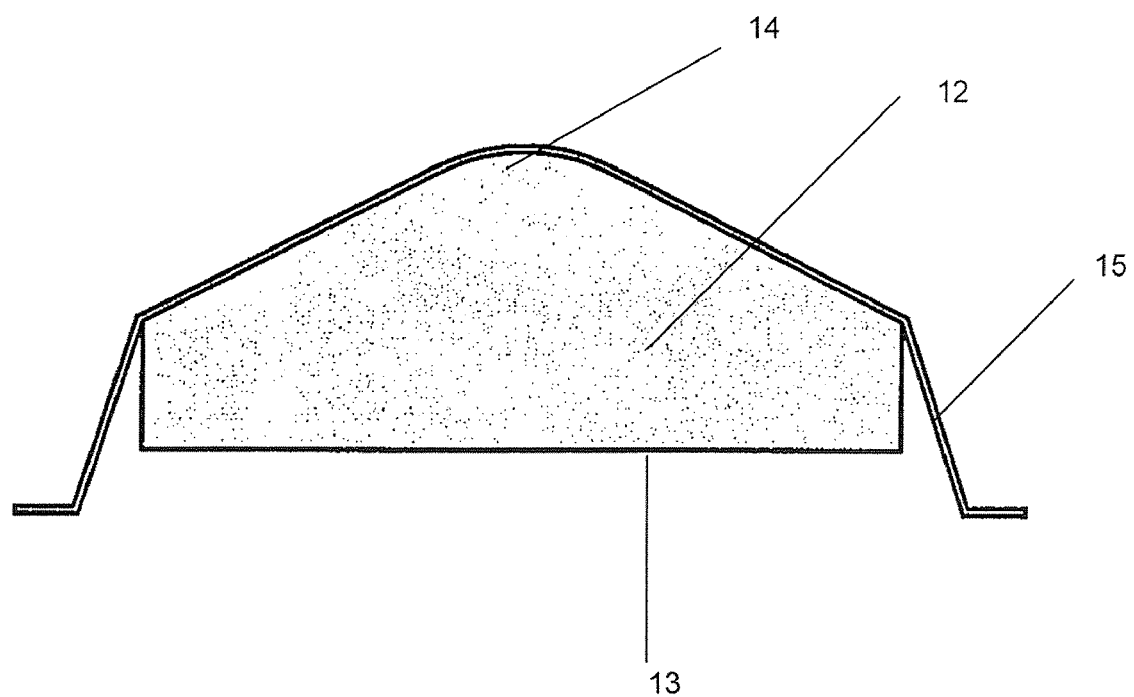

FIGS. 7a, 7b, 7c, 7d and 7e show transverse, i.e. vertical cross-sections of different geometrical shapes of the insulating end block. In all cases the insulating end block has a rectangular base having a planar surface and an opposing surface which is primarily convex in shape and can be smoothly or stepwise rounded outwards e.g. it can be stepped, arched or pyramidal. The different geometrical embodiments of the insulating end block all ensure that the flexible sheet becomes primarily convex in shape and curves in one direction only. In FIGS. 7a, 7d, 7e the flexible sheet is smoothly rounded outwards, while in FIGS. 7b and 7c the flexible sheet is stepwise rounded outwards.

When using the clamping structure of the invention deformation leading to curvature of the fuel cell components is avoided. Thick end plate flanges are also not required, thereby leading to a reduction in the volume and amount of material required to manufacture the flanges, hence reducing the cost of the fuel cell stack. Ultimately, this leads to a reduction in the weight of the SOFC stack, which is desirable.

The clamping structure of the invention allows for gas mani-folding at the sides of the fuel cell stack. The clamping structure can be used at either end of the fuel cell stack. In addition insulation can be placed on two opposing sides of the four sides of the fuel cell stack, advantageously leaving two other opposing sides available for placement of inlets and outlets for fuel and air to the fuel cell stack.

The clamping structure can further comprise tie-rods, springs and nuts known in the art and useful for providing a compressive force when clamping the SOFC stack. The flexible sheet can therefore be provided with attachment means at its borders which allow passage of for instance tie-rods used in assembling the SOFC stack.

The presence of the insulating end block allows the flexible sheet to exist at a temperature lower than the stack temperature. The insulating end block has a preferable thickness of 5-100 mm and a thermal conductivity of 0.01-2.0 W/(mK). The thickness of the insulating end block, its thermal conductivity and the temperature of the surroundings determine the temperature of the flexible sheet during operation of the SOFC stack. It is an advantage to dimension the insulating end block to values which allow the flexible sheet to have a temperature of 100-650° C. during operation.

The size of the flexible sheet is at least the size of the cells in the stack, but due to the curvature one of the two sides will be somewhat longer, preferably 1-2 times the corresponding cell side length.

The flexible sheet is preferably made of steel. However, other types of metal alloys are also useful, for instance alloys based on titanium, aluminium or nickel. A suitable alloy is inconel, which is useful at the high temperatures employed during operation of the stack due to its heat resistance properties. The flexible sheet can be in the form of a thin metallic plate having a thickness of for instance 0.05-5 mm, whereby flexibility is maintained.

Alternatively, the flexible sheet can be made of metal wire mesh, ceramic fabric or composite material. Suitable ceramic fabrics can for instance be based on glass fibres or on ceramic fibre tape such as 3M™ Nextel™. Suitable composite material can be based on carbon, Kevlar® or glass fibres embedded in polyester or epoxy resin. Using these materials is advantageous due to their increased flexibility.

The flexible sheet when positioned for use on the opposing surface of the insulating end block that is primarily convex obtains a shape that curves in one direction only i.e. is single curved, due to the curvature of the opposing surface of the insulating end block. It is preferred that the curvature of the opposing surface has a radius of 0.6 to 5 times the width of the cells. It is advantageous to have a large radius, as this will reduce the overall height of the assembly.

The flexible sheet when positioned for use on the opposing surface of the insulating end block that is primarily convex and stepped with a flat top can lead to the presence of hollow sections between the flexible sheet and the steps of the insulating end block. These hollow sections can advantageously be filled with a second insulation material having better insulation properties than the insulating end block, thereby improving the overall insulation effect.

In addition the presence of stepped sides with a flat top leads to a height of the insulating end block measured from the centre of the rectangular base with the planar surface to the flat top of the opposing surface that is less than the height obtainable with an embodiment that is smoothly rounded outwards.

The insulating end block can be partially or completely made of any commercially available rigid insulating material, e.g. alumina, calcium silicate or vermiculate based blocks. Preferable insulating materials are the calcium silicate types as they provide good machinability, are low in weight and have low heat transfer properties and good compressive strength.

The primarily convex surface of the insulating end block in contact with the flexible sheet can have different geometrical shapes which can ensure that the flexible sheet becomes primarily convex in form when the two surfaces are in contact with each other. A vertical cross-section through the insulating end block shows the primarily convex surface can for instance be of constant radius and have the appearance of a Roman arch that is curved in shape and spanning an opening. In this embodiment the flexible sheet becomes convex in shape, is curved in one direction only and is smoothly rounded outwards. The primarily convex surface is not limited to a fixed radius. Preferred is, however, a radius of 0.6 to 5 times the width of the cells.

In another embodiment a vertical cross-section through the insulating end block shows the primarily convex surface of the insulating end block having one or more stepped sides and a flat top. In these embodiments the flexible sheet becomes primarily convex in shape and is stepwise rounded outwards. It is curved in one direction only.

In an embodiment of the invention the SOFC stack has a flexible sheet and an insulating end block with a primarily convex surface i.e. has the clamping structure of the invention at one end of the stack only. In another embodiment of the invention the SOFC stack has a flexible sheet and an insulating end block, with a primarily convex surface i.e., has the clamping structure of the invention at both ends of the stack.

FIG. 1 shows a disassembled arrangement of a conventional cross flow SOFC stack with two fuel cells. The SOFC stack comprises two solid oxide fuel cells 1 alternating with interconnects 2. The SOFC stack typically has an end plate 3 made of metal or ceramics at one end and at the opposite end a manifold plate 4 typically made of metal and assisting in the transfer of gases to fuel cells 1. When the elements of the SOFC stack are assembled, the compressive force is obtained by clamping the stack between planar end plate flanges 5 using a system of rigid tie-rods 6, springs 7 and nuts 8. In this type of assembly tie-rods 6 are inserted through pipe sections 9 useful in distancing the springs 7 from the fuel cell stack in order to maintain the springs 7 at a lower temperature than the stack temperature.

Figure 2:
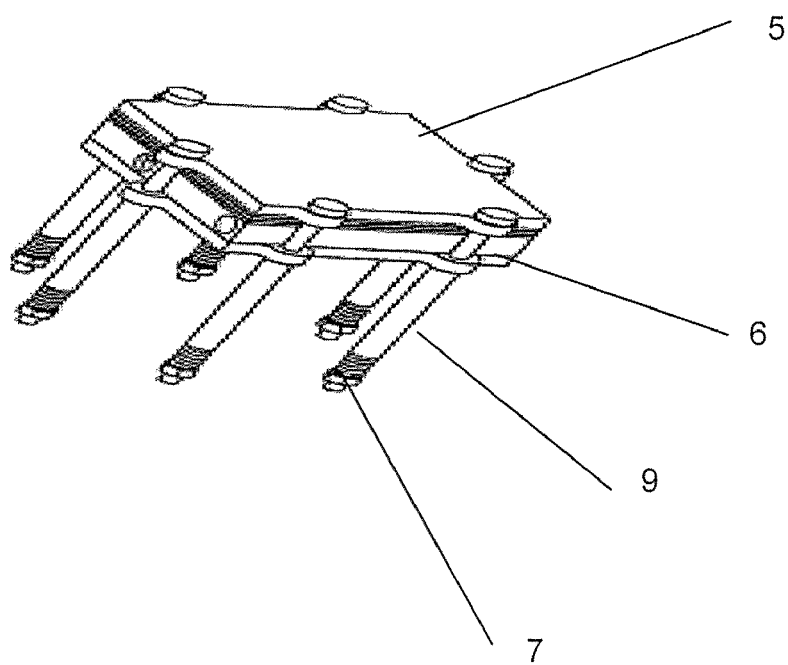
FIG. 2 shows the conventional assembled SOFC stack.

FIG. 2 shows the conventional SOFC stack of FIG. 1 when assembled. It can be seen that pipe sections 9 ensure that springs 7 are distanced from the SOFC stack.

Figure 3:
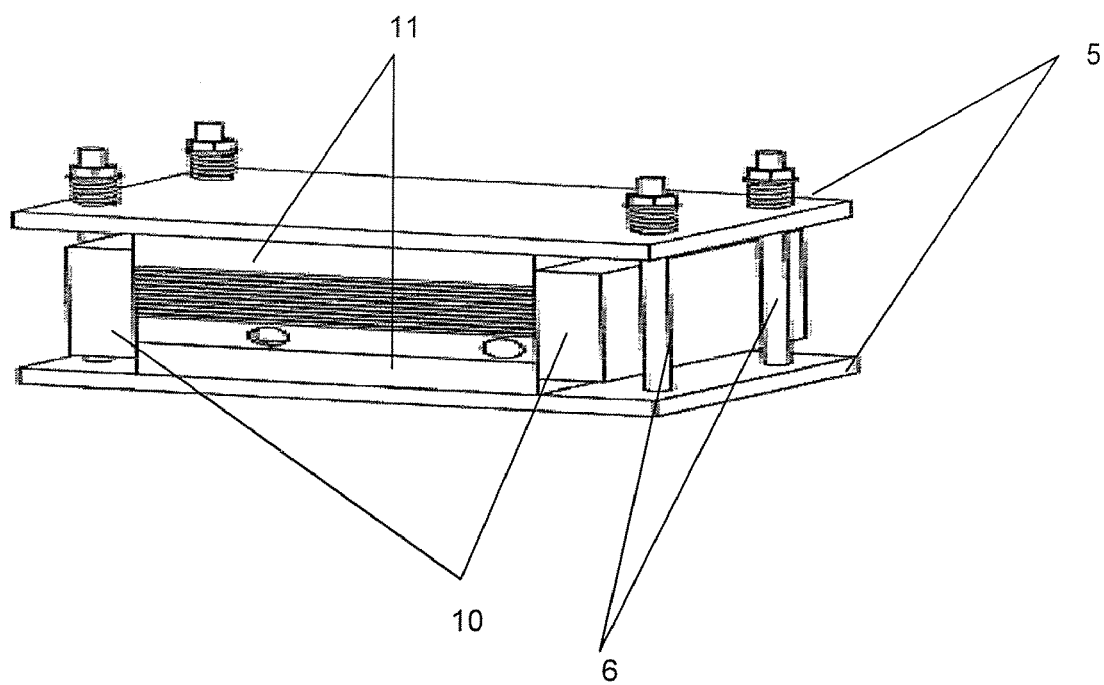
FIG. 3 shows a conventional assembled SOFC stack.

FIG. 3 shows another example of a conventional assembled SOFC stack. In this type of clamping structure tie-rods 6 and planar end plate flanges 5 are during operation at a much lower temperature than the SOFC stack's operation temperature. This is made possible by thermally insulating the SOFC stack at the sides of the stack by using insulation material 10. Placing additional insulation material 11 at either end of the stack adjacent to planar end plate flanges 5 allows a transfer of the compressive force obtained during clamping through the additional insulation material 11. The tie-rods 6 and the planar end plate flanges 5 can thus experience greater tension before undesirable creep sets in.

Figure 4:
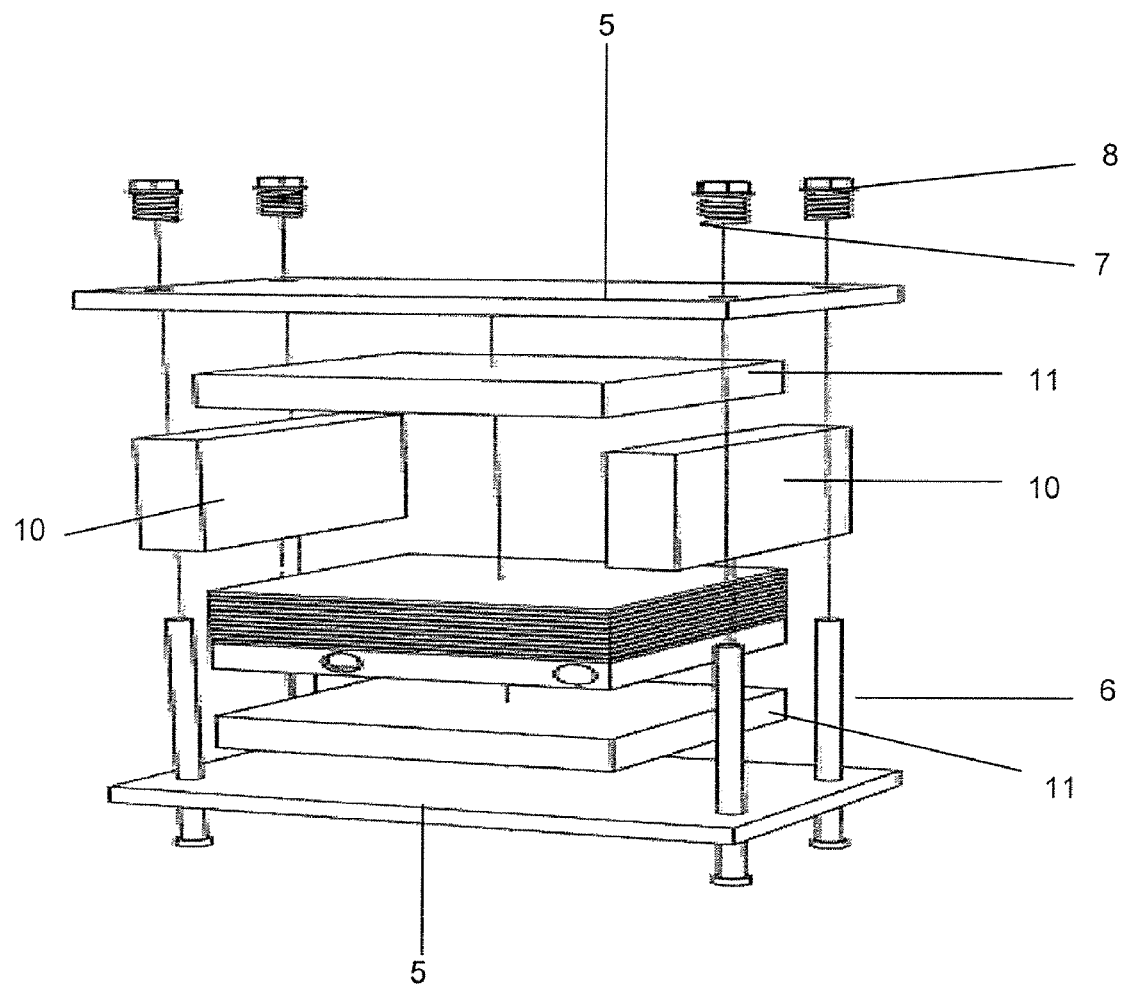
FIG. 4 shows a conventional dissembled SOFC stack.

FIG. 4 shows the conventional disassembled SOFC stack of FIG. 3. Insulation material 10 at the sides of the stack and additional insulation material 11 at either end of the stack adjacent to planar end plate flanges 5 are all planar in shape.

As mentioned earlier the planar end plate flanges in these conventional clamping structures experience a bending force when exposed to the mechanical forces originating from the tie-rods 6 and the stack. Poorer electrical contact and gas leakage therefore can occur if these bending forces make the end plate flanges bend.

Figure 5:
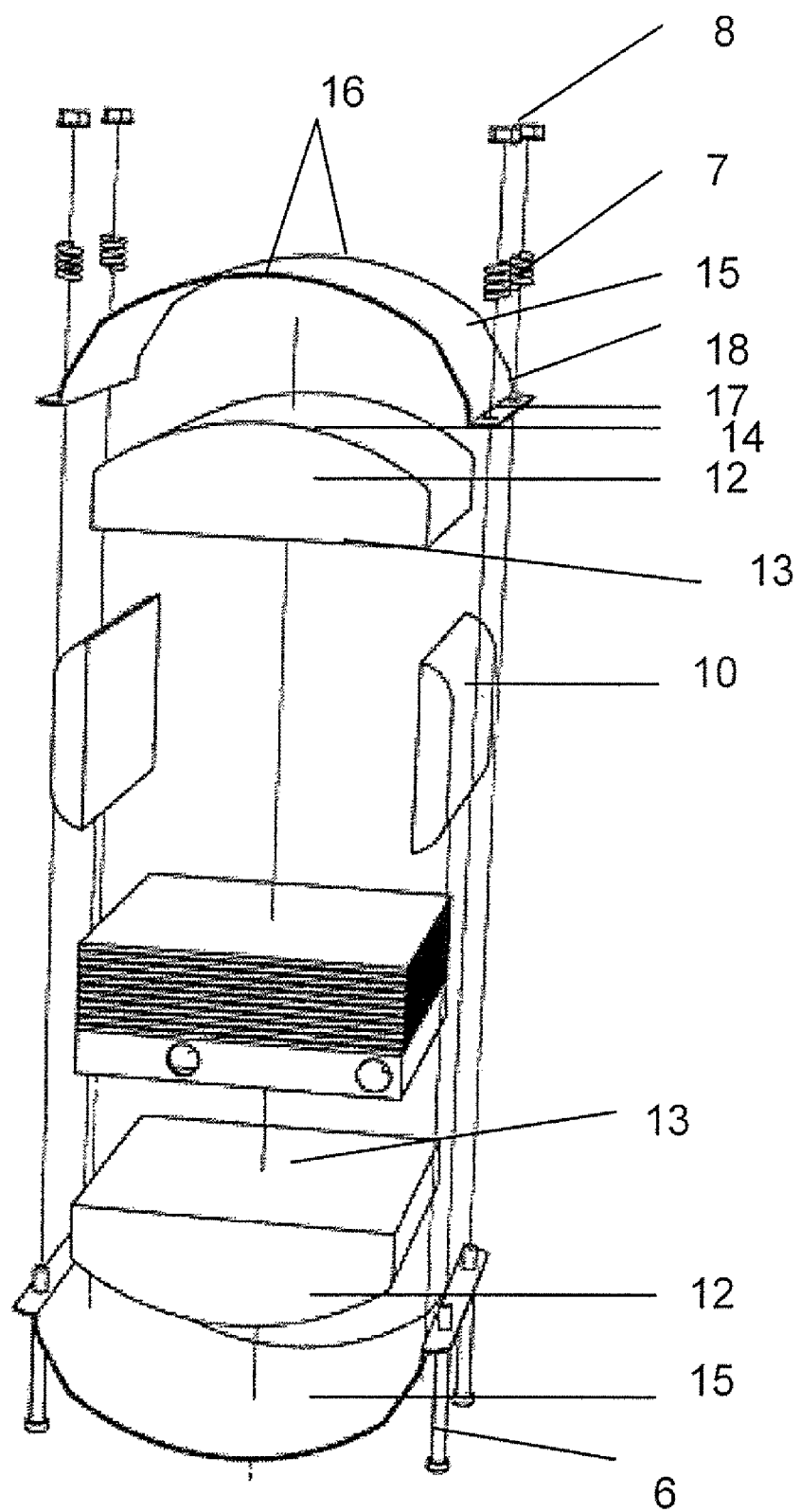
FIG. 5 shows a dissembled SOFC stack of the invention.

FIG. 5 shows an embodiment of the invention in which the various components of the SOFC stack clamping structure are disassembled. The SOFC stack is inserted between two insulating end blocks 12. Each insulating end block 12 has a planar surface 13 adjacent to the SOFC stack and an opposing surface 14 that is the primarily convex surface adjacent to flexible sheet 15. The vertical cross section of the insulating end block 12 shows the primarily convex surface having a semi-cylindrical shape and positioned on a rectangular base having the same overall dimensions as the SOFC stack. The sides of the SOFC stack are also insulated with insulation material 10 in this embodiment.

Flexible sheet 15 is forced into the convex shape when in contact with the insulating end block 12 and the components of the SOFC stack are assembled for clamping. The flexible sheet 15 is overall rectangular in shape with the longer sides 16 partially in contact with the insulating end block 12 and partially in contact with insulation material 10 at the sides of the insulating end block, and the shorter sides 17 of flexible sheet 15 extending down the sides of the SOFC stack. The shorter sides 17 are bent at a pre-determined angle and length and have perforations 18 for passage of the tie-rods 6. Flexible sheet 15 is curved in one direction only and is smoothly rounded.

Figure 6:
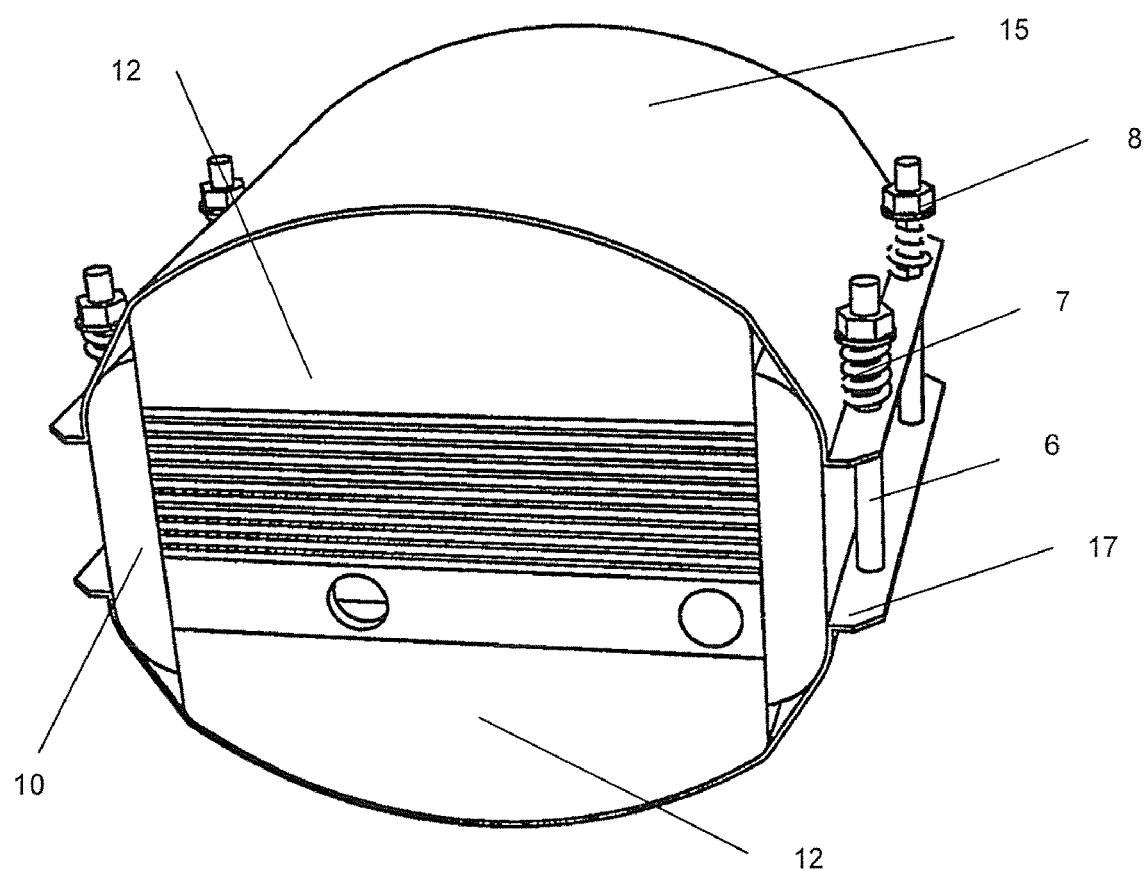
FIG. 6 shows an assembled SOFC stack of the invention.

FIG. 6 shows the same embodiment as in FIG. 5. However, the various components of the SOFC stack clamping structure are assembled. It can be seen that after clamping the flexible sheet 15 is convex in form. The flexible sheet 15 does therefore not have to withstand bending forces and the mechanical tension lies in the plane of the flexible sheet. The compressive force is obtained after clamping with the assistance of nuts 8, springs 7 and tie-rods 6 extending through perforations 18 in the flexible sheet 15.

In further embodiments of the invention, FIGS. 7a, 7b, 7c, 7d and 7e show transverse i.e. vertical cross-sections of different geometrical shapes of the insulating end block. In all cases the insulating end block 12 has a rectangular base having a planar surface 13 and an opposing surface 14, which is primarily convex in shape and can be geometrically shaped in various manners. The different geometrical embodiments of the insulating end block 12 all ensure that the flexible sheet 15 becomes primarily convex in shape and curves away smoothly or stepwise from the SOFC stack, curving in one direction only.

In FIG. 7a the transverse i.e. vertical cross section through the insulating end block 12 shows opposing surface 14 having a primarily convex surface that is of constant radius and has the appearance of an arch. The flexible sheet 15 is thus convex in shape, is smoothly rounded outwards and curves in one direction only.

In FIG. 7b the transverse i.e. vertical cross section through the insulating end block 12 shows opposing surface 14 having a primarily convex surface that is of constant radius and has two steps 19 and a flat top 20 i.e. opposing surface 14 is stepped. In this embodiment the flexible sheet 15 is primarily convex in shape and is stepwise rounded outwards, curving in one direction only. This embodiment has hollow sections 21 between the steps 19 and flexible sheet 15. The presence of hollow sections 21 can advantageously be filled with a second insulation material (not shown) having better insulation properties than insulating end block 12, thereby improving the overall insulation effect.

In FIG. 7c the transverse i.e. vertical cross section through the insulating end block 12 shows opposing surface 14 having a primarily convex surface that has diagonally sloping sides 21 and a flat top 20. In this embodiment the flexible sheet 15 is primarily convex in shape, curves in one direction only and is stepwise rounded outwards.

The embodiments shown in FIGS. 7b and 7c have a flexible sheet that is stepwise rounded outwards with a flat top and curves in one direction only. The height of the insulating end block measured from the centre of the rectangular base with the planar surface to the flat top of the opposing surface is less than the height obtainable with an embodiment that is smoothly rounded outwards such as the embodiment shown in FIG. 7a. The solid oxide fuel cell stack having an insulating end block that is stepped with a flat top thus advantageously has a lower volume and weight than a stack which is smoothly rounded outwards.

In FIG. 7d the transverse i.e. vertical cross section through the insulating end block 12 shows opposing surface 14 having a primarily convex surface that has a radius larger than the radius of the arch in FIG. 7a. The flexible sheet is thus convex in shape, curves in one direction only and is smoothly rounded outwards. Preferred is a radius of 0.6 to 5 times the width of the cells.

In FIG. 7e the transverse i.e. vertical cross-section through the insulating end block 12 shows opposing surface 14 having a primarily convex surface that is triangular or pyramidal in shape with a rounded tip. In this embodiment the flexible sheet 15 also is primarily convex in shape, is curved in one direction only and is smoothly rounded outwards.

Figure 8A:
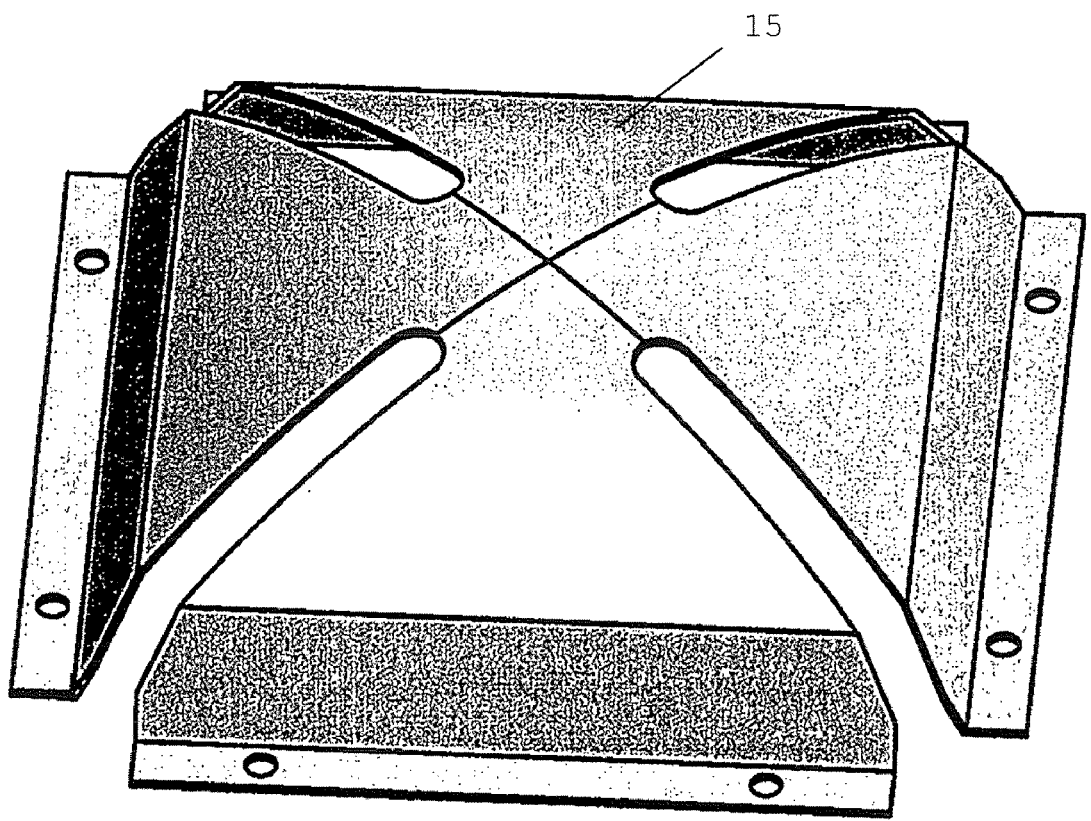
FIGS. 8a and 8b show different geometrical embodiments of the flexible sheet seen from the top of the stack.
Figure 8B:
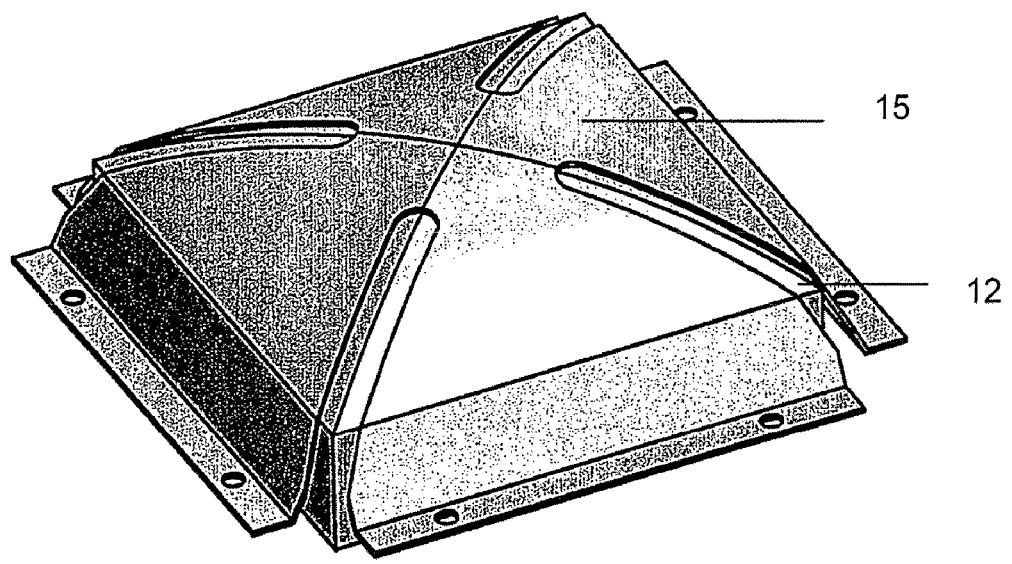

In yet an embodiment of the invention FIGS. 8a and 8b show different geometrical shapes of the flexible sheet seen from the top of the stack. FIG. 8a shows flexible sheet 15 and FIG. 8b shows flexible sheet 15 shown in FIG. 8a placed on insulating end block 12. Insulating end block 15 is convex viewed from one side of the stack and at the same time it is convex when viewed from an angle perpendicular to the first view. The convex shape is therefore more like a hemisphere than a half cylinder. The convexity can be established by a combination of the geometries shown in FIGS. 7a to 7e. In these embodiments the flexible sheet 15 is curved in all directions i.e. is double curved.

What is claimed is:

1. Clamping structure for a planar solid oxide fuel cell stack comprising a flexible sheet and a rigid, thermally insulating end block, the flexible sheet being capable of bending into a primarily convex shape, the rigid, thermally insulating end block shaped as a rectangular base with a planar surface and an opposing surface that is primarily convex in shape, the flexible sheet being placed on the opposing surface of the rigid, thermally insulating end block, the flexible sheet thereby bending to obtain a shape that is primarily convex upon compression, wherein the flexible sheet does not have to withstand bending forces and has a thickness of 0.05-5 mm.

2. Clamping structure according to claim 1, wherein the flexible sheet is bent to obtain a shape that is curved in one direction only.

3. Clamping structure according to claim 2, wherein the opposing surface of the rigid, thermally insulating end block is smoothly or stepwise rounded outwards into the primarily convex shape.

4. Clamping structure according to claim 3, wherein the opposing surface of the rigid, thermally insulating end block is stepped or pyramidal in shape.

5. Clamping structure according to claim 1, wherein the flexible sheet is bent to obtain a shape that is curved in more than one direction.

6. Clamping structure according to claim 1, wherein the flexible sheet is made of metal.

7. Clamping structure according to claim 6, wherein the metal is steel or an alloy of titanium, aluminium or nickel.

8. Clamping structure according to claim 1, wherein the flexible sheet is made of a fabric of ceramic fibers, metal wire mesh or a composite material based on glass, or carbon fibers embedded in polyester or epoxy resin.

9. Clamping structure according to claim 1, wherein the rigid, thermally insulating end block has a thermal conductivity of 0.01-2.0 W/mK.

10. Clamping structure according to claim 1, wherein the rigid, thermally insulating end block is made of alumina, calcium silicate or vermiculite based material.

11. Clamping structure according to claim 1, wherein the flexible sheet has a length and a breadth of 1-2 times the corresponding solid oxide fuel cell length and breadth in the stack.

12. Clamping structure according to claim 1, wherein the bent flexible sheet has a radius of 0.6 to 5 times the width of the solid oxide fuel cells.

13. Solid oxide fuel cell stack comprising the clamping structure of claim 1, wherein the stack comprises one or more planar, solid oxide fuel cells interposed between end plates, at least one end plate lying adjacent to the clamping structure comprising a flexible sheet and a thermally insulating end block, the flexible sheet being capable of bending into a primarily convex shape, the thermally insulating end block shaped as a rectangular base with a planar surface and an opposing surface that is primarily convex in shape, the flexible sheet being placed adjacent to the opposing surface of the thermally insulating end block, the flexible sheet thereby bending to obtain a shape that is primarily convex, wherein the flexible sheet does not have to withstand bending forces and has a thickness of 0.05-5 mm, and the at least one end plate being in contact with the planar surface of the rectangular base of the thermally insulating end block.

14. Solid oxide fuel cell stack of claim 13, wherein the clamping structure is positioned at each end plate.

* * * * *